United States Patent
Hodac

(10) Patent No.: US 10,151,667 B2
(45) Date of Patent: Dec. 11, 2018

(54) METHOD FOR MONITORING DEFORMATION OF A ROTATING ELEMENT VIA A MONITORING DEVICE EMPLOYING OPTICAL FIBRE, AND WIND TURBINE EQUIPPED WITH SUCH A DEVICE

(71) Applicant: OSMOS SA, Paris (FR)

(72) Inventor: Bernard Hodac, Paris (FR)

(73) Assignee: OSMOS SA, Paris (FR)

( * ) Notice: Subject to any disclaimer, the term of this patent is extended or adjusted under 35 U.S.C. 154(b) by 0 days.

(21) Appl. No.: 14/775,473

(22) PCT Filed: Mar. 21, 2013

(86) PCT No.: PCT/FR2013/050607
§ 371 (c)(1),
(2) Date: Sep. 11, 2015

(87) PCT Pub. No.: WO2014/147301
PCT Pub. Date: Sep. 25, 2014

(65) Prior Publication Data
US 2016/0018286 A1   Jan. 21, 2016

(51) Int. Cl.
*G01M 13/04* (2006.01)
*G01D 5/353* (2006.01)
*F03D 17/00* (2016.01)

(52) U.S. Cl.
CPC ............. *G01M 13/04* (2013.01); *F03D 17/00* (2016.05); *G01D 5/353* (2013.01)

(58) Field of Classification Search
CPC .................................................. G01M 13/04
USPC ........................................................ 356/73.1
See application file for complete search history.

(56) References Cited

U.S. PATENT DOCUMENTS

| | | |
|---|---|---|
| 4,560,016 A | 12/1985 | Ibanez et al. |
| 5,044,205 A | 9/1991 | Wolff et al. |
| 5,374,821 A | 12/1994 | Muhs et al. |
| 5,594,239 A | 1/1997 | Lessing |

(Continued)

FOREIGN PATENT DOCUMENTS

EP     2290235     3/2011

OTHER PUBLICATIONS

International Search Report from International Patent Application No. PCT/FR2013/050607, dated Nov. 21, 2013.

(Continued)

*Primary Examiner* — Abdullahi Nur
*Assistant Examiner* — Omar Nixon
(74) *Attorney, Agent, or Firm* — Greer, Burns & Crain, Ltd.

(57) ABSTRACT

In the field of monitoring the aging of parts subjected to a rotary movement and, more precisely, of monitoring the deformation to which a peripheral surface of a rotating part is possibly subject, an improved method is provided. The method includes: a step of emitting a light signal at a first end of an optical fiber at least one section of which runs between two points of the surface of the part; a step of measuring a characteristic of the light signal received at a second end of the optical fiber, the characteristic varying as a function of the length of the optical fiber between its ends; and a step of comparing the characteristic of the light signal to a reference signal.

12 Claims, 5 Drawing Sheets

(56) References Cited

U.S. PATENT DOCUMENTS

| | | | |
|---|---|---|---|
| 5,693,936 A | 12/1997 | Komachiya et al. | |
| 2009/0262331 A1* | 10/2009 | Burchardt | G01M 5/0016 356/32 |
| 2010/0158434 A1 | 6/2010 | Becker | |
| 2011/0211200 A1* | 9/2011 | Cribbs | F03D 1/0675 356/614 |
| 2012/0161446 A1* | 6/2012 | McNeill | F03D 1/0675 290/55 |
| 2012/0198849 A1* | 8/2012 | Johnston | F01D 17/02 60/722 |
| 2012/0328232 A1* | 12/2012 | Reedman | G01D 5/35303 385/12 |

OTHER PUBLICATIONS

Japanese Office Action (Translation) to corresponding JP Patent Application No. 2016-503695 dated Nov. 21, 2017 (5 pages).

\* cited by examiner

METHOD FOR MONITORING DEFORMATION OF A ROTATING ELEMENT VIA A MONITORING DEVICE EMPLOYING OPTICAL FIBRE, AND WIND TURBINE EQUIPPED WITH SUCH A DEVICE

BACKGROUND

The invention is situated within the field of monitoring the ageing of parts subject to a rotary movement. It relates in particular to monitoring the rotating elements of a wind turbine. More specifically, the invention relates to a method for monitoring the deformations of a surface of a part capable of undergoing a rotary movement, by means of a measuring device comprising an optical fibre acting as a sensor.

It is known to monitor static civil engineering structures such as a building, tunnel or bridge, by determining their overall deformations, i.e. deformations between at least two relatively distant points of the structure. This is made possible in particular by the installation of an optical fibre stretched between two points of the structure, and by analysis of the variation in a light signal transmitted via the optical fibre. For example, document EP 0 649 000 A1 describes a system for monitoring a building comprising two support plates and an optical fibre fastened to each of the support plates and extending between them to form arcs. Measurement of the amplitude of a light signal passing through the optical fibre makes it possible to determine the variation in the curvature of the arcs, and therefore the relative displacement of the two support plates.

In a machine, some parts, in particular moving parts, are at risk of breakage. However, most of the time it is impossible to equip these parts with optical fibres that are suitably arranged relative to the likely damage, which may be diverse. For example, the deformations of a rotor blade of a wind turbine cannot be monitored by installing sensors on the rotor blade. The same is true for a propeller, a piston, and more generally for any moving part. Furthermore, even in the event that such sensors can be installed on the part to be monitored, the movement of this part presents several difficulties. Firstly, the sensor's measurement can be disturbed by inertial or centrifugal forces or, where applicable, by a gravitational force that varies as a function of the angular position of the part equipped with the sensor.

Secondly, the installation of sensors on a rotating part introduces asymmetry that is likely to accelerate the ageing of the part itself or of another part of the mechanism, for example a mechanical bearing. Finally, the transmission of the measurements to an external device such as a monitoring station, via electrical conductors, is impossible. This problem of transmission of the measurements becomes even more difficult when a large number of sensors is necessary for monitoring the condition of the part.

SUMMARY

A purpose of the invention is in particular to overcome all or part of the aforementioned drawbacks by proposing a method for monitoring deformations of a rotating element that has the smallest possible impact on the operation and ageing of this rotating element, and which is itself not affected by the rotary movement. To this end, the invention is based on the property according to which a moving part, in which a flaw such as a crack has begun, propagates a cyclic stress flaw in the structure and therefore a deformation. In fact, any cracking is preceded by non-homogeneity of the stresses in the part or by non-homogeneity of the material. This non-homogeneity goes hand in hand with non-homogeneity of the deformations of the part. When the part moves in rotation, this non-homogeneity of the deformations necessarily results in non-homogeneity of the dynamic stresses generated and distributed over the entire part. In particular, the part locally undergoes a compression-decompression cycle during which the stresses are distributed differently over time. The cyclic deformations of the part can be detected in a site of the structure chosen as a strategic site both for the relative ease of installation of the sensor, and for the capacity of this site to undergo stress variations in the event of a flaw. Thus, in the case of a rotor blade of a wind turbine, a single sensor arranged on all or part of the circumference of the base of the rotor blade will react to any damage undergone by the rotor blade, both locally and at any other point of the rotor blade. More specifically, the purpose of the invention is a method for monitoring deformations that may occur on a surface of a part capable of undergoing a rotary movement, the method being characterized in that it comprises:

a step of emitting a light signal at a first end of an optical fibre at least one section of which is stretched between two points of the surface of the part, a step of measuring a characteristic of the light signal received at a second end of the optical fibre, said characteristic developing as a function of the length of the optical fibre between its ends, and a step of comparing the characteristics of the light signal with a reference signal.

The section of optical fibre preferably follows a convex portion of the surface of the part, in order to be capable of remaining in contact with the part over its entire length.

The part is for example a rotating element of a wind turbine or a turbine. It can in particular be a ring of a mechanical bearing.

According to a particular embodiment, a plurality of optical fibres are used, each optical fibre comprising a section stretched between two points of the surface of the part. In this embodiment, for each optical fibre:

a light signal is emitted at a first end, a characteristic of the light signal received at a second end is measured, and the characteristic of the light signal is compared with a reference signal.

The optical signals are preferably emitted simultaneously in each optical fibre in order to allow the results to be corroborated.

In a first embodiment, two optical fibres are used, the stretched section of a first optical fibre being arranged with respect to the stretched section of the second optical fibre according to an axial symmetry an axis of symmetry of which is an axis of the rotary movement of the part.

In a second embodiment, the surface is a surface of revolution an axis of revolution of which is merged with an axis of the rotary movement of the part. The stretched sections of the optical fibres can then be angularly distributed along the axis of revolution in order to cover a circumference of the surface of revolution.

The method can also contain a step of transmission, by wireless link means, of each measured characteristic, or of the result of each comparison between the measured characteristic and the reference signal, or of a part of these elements. The transmission step can be carried out only in the case of an anomaly, in particular so as to limit the electricity consumption of the wireless link means. In fact, due to the rotary movement of the part, these means are generally supplied by a battery mounted on the part. Limiting the electricity consumption then makes it possible to extend the life of the battery. Moreover, it is also possible to provide for an electricity generator driven by the movement of the part so as to recharge the battery.

According to a particular embodiment, the emission, measurement and comparison steps are carried out continuously for a determined duration in order to allow monitoring of the deformations of the part for at least one complete rotation of the part.

A subject of the invention is also a wind turbine comprising a part capable of undergoing a rotary movement, and a device for monitoring deformations of the part. The monitoring device comprises:

- an optical fibre at least one section of which is stretched between two points of a surface of the part,
- a light source capable of emitting a light signal at a first end of the optical fibre,
- a detector capable of measuring a characteristic of the light signal received at a second end of the optical fibre, said characteristic developing as a function of the length of the optical fibre between its ends, and
- a processing module capable of comparing the characteristic of the light signal to a reference signal.

BRIEF DESCRIPTION OF THE DRAWINGS

The invention will be better understood and other advantages will become apparent on reading the following description, with reference to the attached drawings in which.

DETAILED DESCRIPTION

The invention is based on a monitoring device utilizing the properties of propagation of a light signal in an optical fibre firmly fastened to the part to be monitored at at least two points. It is in fact well known that an elongation of the optical fibre in its longitudinal direction involves a contraction in the transversal direction, which affects the attenuation effect of the amplitude of the light signal passing through the optical fibre. Braided or twisted optical fibres are also known, the length variation in which is shown by variations in the local curvatures, which also have the effect of modifying the amplitude of the signal received after transmission via the optical fibre. Thus, measuring the amplitude of the light signal makes it possible, by comparison with a reference amplitude, to determine quite accurately the variation in length undergone by the monitored part between the two points to which the optical fibre is fastened. Patent application EP 0 264 622 A1 describes an example of such a monitoring device. The device comprises an optical fibre, and a measuring device capable of emitting a light signal at one end of the optical fibre and measuring the amplitude of the light signal received at the other end of the optical fibre.

Figure 1:
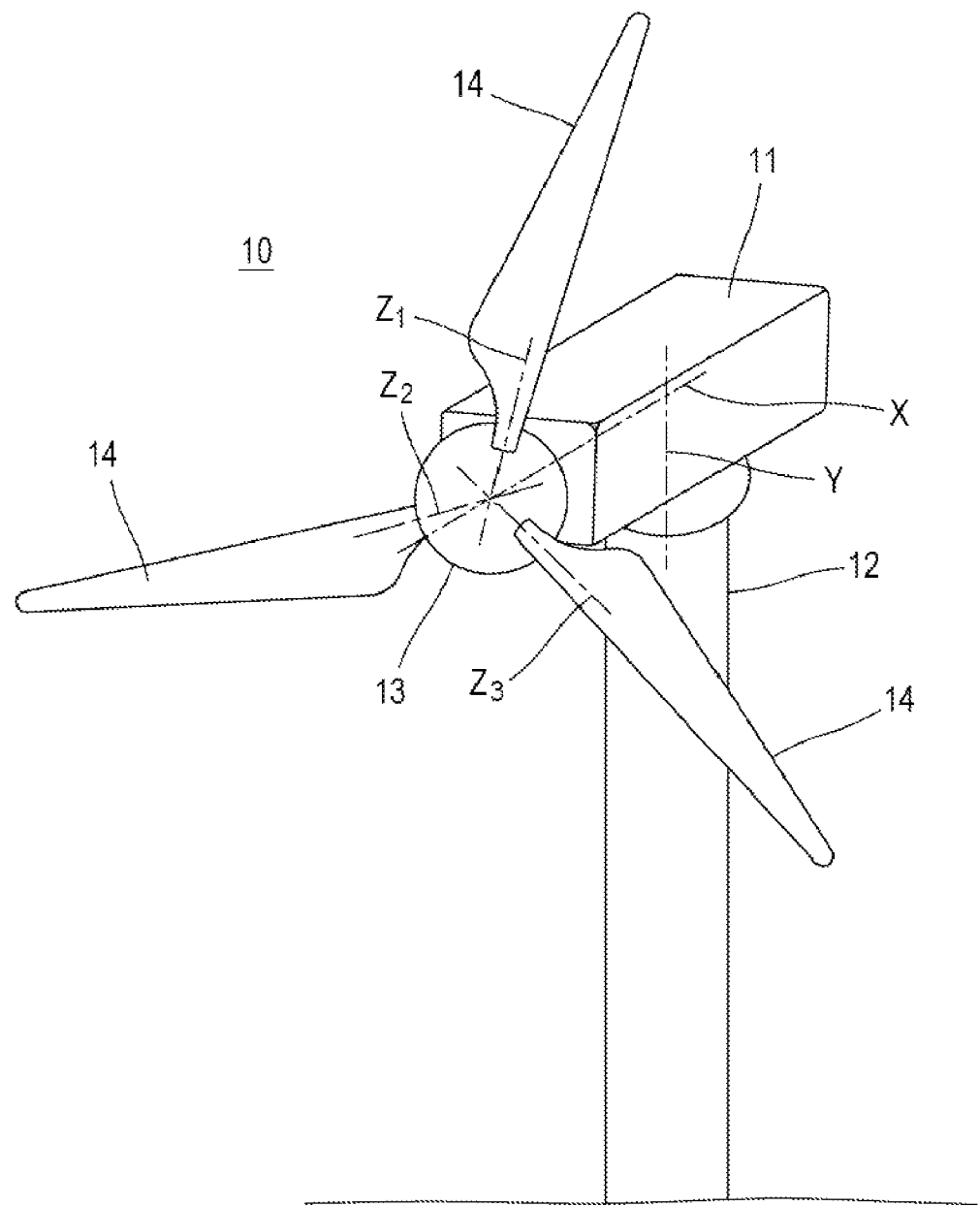
FIG. 1 shows diagrammatically an example of a wind turbine used as an electricity generator, the parts of which can be monitored by the method according to the invention.

FIG. 1 shows diagrammatically an example of a wind turbine used as an electricity generator. The wind turbine 10 comprises a nacelle 11 supported by a tower 12, a hub 13 pivotably linked to the nacelle 11 along a substantially horizontal axis X, and rotor blades 14 supported by the hub 13. The nacelle 11 is pivotably linked to the tower 12 along a substantially vertical axis Y, in order to allow the orientation of the axis X in a direction parallel to the wind direction. In addition, each rotor blade 14 is pivotably linked to the hub 13 along an axis $Z_1$, $Z_2$ or $Z_3$, so as to allow the orientation of each rotor blade as a function of the wind speed. The axes $Z_1$, $Z_2$ and $Z_3$ are perpendicular to the axis X, and converge at a point of the axis X. Preferably, they are uniformly distributed about the axis X, i.e. with an angle of 120 degrees between them. Usually, the nacelle 11 contains an alternator, not shown, a shaft of which is driven in rotation, directly or indirectly, by the hub 13. The nacelle 11 can also contain drive means, not shown, capable of driving the rotation of the rotor blades 14 with respect to the hub 13 along their respective axis $Z_1$, $Z_2$ or $Z_3$.

Figure 2:
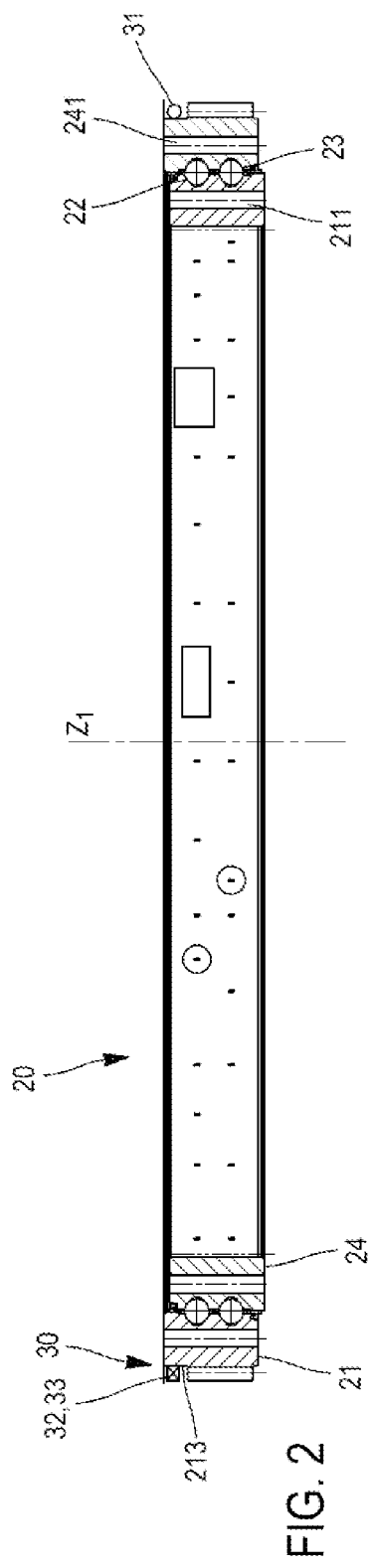
FIGS. 2 and 3 show an example of a ball bearing on which a deformations monitoring device can be installed capable of implementing the method according to the invention.
Figure 3:
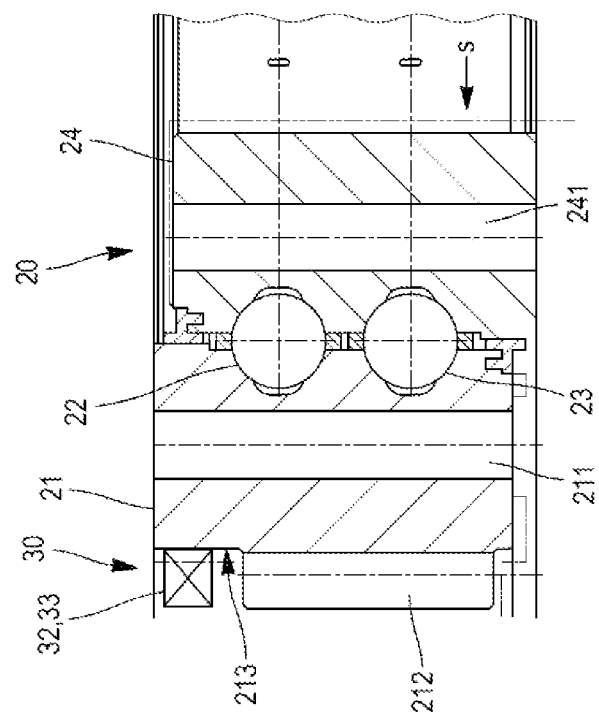

FIGS. 2 and 3 show an example of a ball bearing on which a deformations monitoring device can be installed. FIG. 2 shows the ball bearing in a cross-section view, and FIG. 3 shows this bearing in a partial cross-section view. The ball bearing 20 provides the pivotable link between the hub 13 and one of the rotor blades 14. By way of example, reference will be made to the pivotable link along the axis $Z_1$. The bearing 20 comprises an outer ring 21, a first row of balls 22, a second row of balls 23, and an inner ring 24. The outer diameter of the bearing 20 is for example of the order of two meters in diameter. In an embodiment, the hub 13 is firmly fastened to the inner ring 24, and the rotor blade 14 is firmly fastened to the outer ring 21. The fastening of the hub 13 to the inner ring 24 is carried out, in this example, by a set of fastening elements uniformly distributed at the circumference of the inner ring 24. Each fastening element comprises for example a stud and two nuts. The inner ring 24 then comprises a set of attachment holes 241 produced parallel to the axis $Z_1$; the hub 13 similarly comprises a set of attachment holes each capable of adopting a position opposite one of the attachment holes 241. Each stud passes through an attachment hole 241 of the inner ring 24 and an attachment hole of the hub 13. A nut is screwed onto each end of the studs so as to firmly fix the hub 13 to the inner ring 24. Similarly, fastening a rotor blade 14 to the outer ring 21 can be carried out by studs and nuts. The outer ring 21 can then contain attachment holes 211, for example parallel to the axis $Z_1$. Of course, any other suitable fastening means could be used in order to fasten the rotor blade 14 firmly to the outer ring 21 and the hub 13 to the inner ring 24. The bearing 20 is for example an angular contact bearing, so as to withstand axial stress along the axis $Z_1$ due in particular to the gravitational force and the centrifugal force to which the rotor blade 14 is subject. The bearing 20 shown in FIGS. 2 and 3 also contains a saw tooth bit 212 formed on a peripheral surface 213 of the outer ring 21. The saw tooth bit 212 can engage with a pinion, not shown, which is driven in order to orientate the rotor blade 14, for example as a function of the wind speed.

For the purpose of monitoring the occurrence of deformations on the peripheral surface 213 of the outer ring 21, a deformations monitoring device 30 can be installed there. It should be noted that the monitoring device 30 of course makes it possible to detect deformations due to damage undergone by the outer ring 21 itself, but also by any part linked thereto. The monitoring device 30 contains an optical fibre 31, a light source 32 capable of emitting a light signal at a first end of the optical fibre 31, and a detector 33 capable of measuring a characteristic of the light signal received at a second end of the optical fibre 31. The measured characteristic develops as a function of the length of the optical fibre 31 between its ends. This may be for example the amplitude of the light signal, or the duration of travel of the light signal between the two ends of the optical fibre 31. It should be noted that the light source 32 and the detector 33 can be grouped together in one and the same module. Moreover, one of the physical ends of the optical fibre 31 can be coupled to a reflector capable of reflecting the light signal. The second physical end of the optical fibre 31 is then used for both emitting and receiving the light signal. So as to make it possible to monitor the deformations of the peripheral surface 213, the optical fibre 31 must contain at least one section stretched between two points of the peripheral surface 213. Usually, the section follows the peripheral surface 213. According to a preferred embodiment, the optical fibre 31 is installed so that the section is subjected to a pre-stress tension. Thus, the section undergoes variation in length, in this case a contraction, even in the case in which the deformations of the peripheral surface 213 involves the two points to which the optical fibre 31 is fastened coming closer together. According to a particular embodiment, the optical fibre 31 is prestressed over its entire length, i.e. between the end connected to the light source 32 and that connected to the detector 33.

Figure 4:
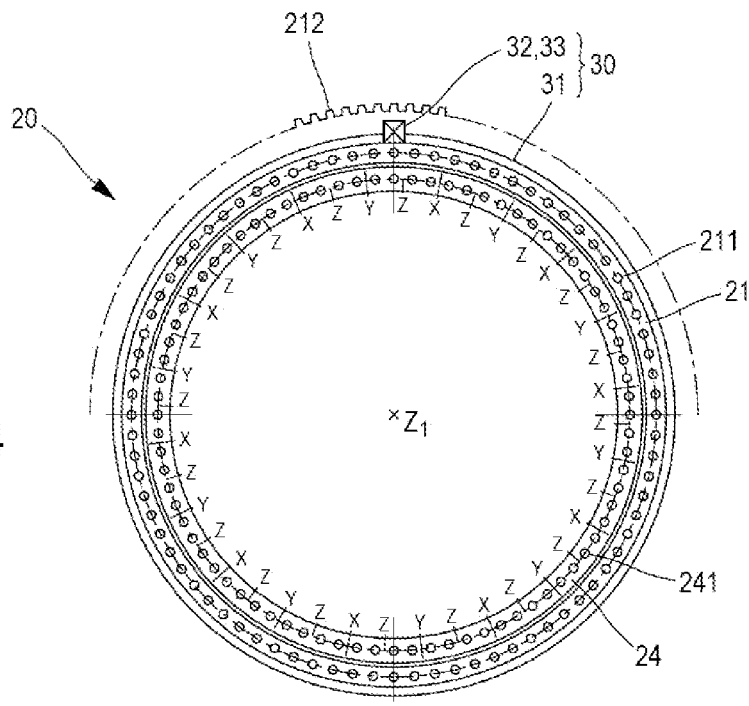
FIGS. 4, 5 and 6 show different examples of implementation of the monitoring device on the ball bearing in FIGS. 2 and 3.

FIG. 4 shows a first example of implementation of the deformations monitoring device 30 on the bearing 20. In this example, the light source 32 and the detector 33 are contained in a single module, and the optical fibre 31 runs over the entire perimeter of the peripheral surface 213. Preferably, the optical fibre 31 is prestressed over its entire length.

Figure 5:
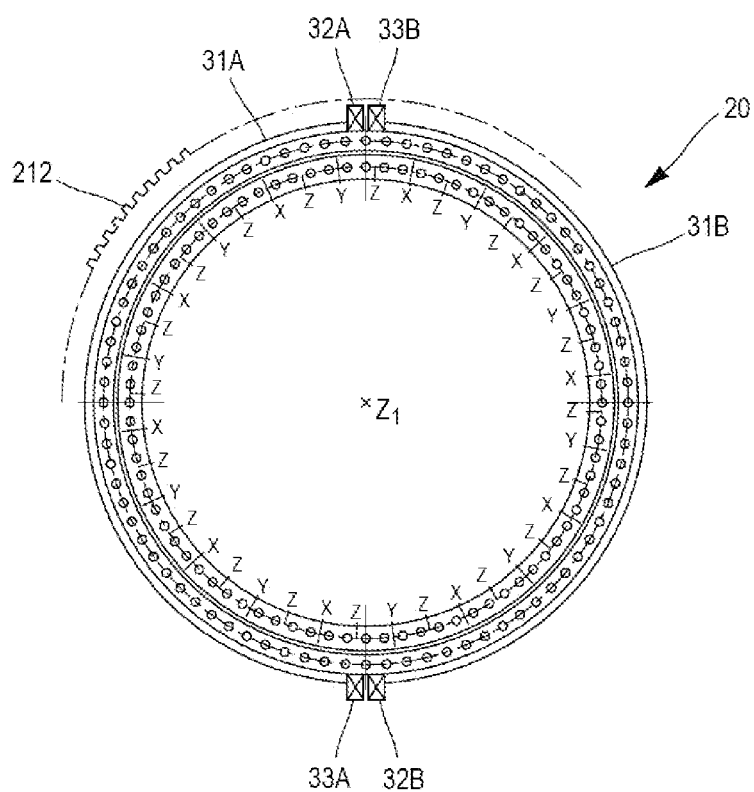

FIG. 5 shows a second example of installation of a deformations monitoring device 50 on the bearing 20. In this example, the device 50 comprises two light sources 32A and 32B, two detectors 33A and 33B, and two optical fibres 31A and 31B. The optical fibre 31A runs over a first half of the perimeter of the peripheral surface 213, between the light source 32A and the detector 33A, and the optical fibre 31B runs over a second half of the perimeter of the peripheral surface 213, between the light source 32B and the detector 33B. Each optical fibre 31A, 31B, 31C is preferably prestressed over its entire length.

Figure 6:
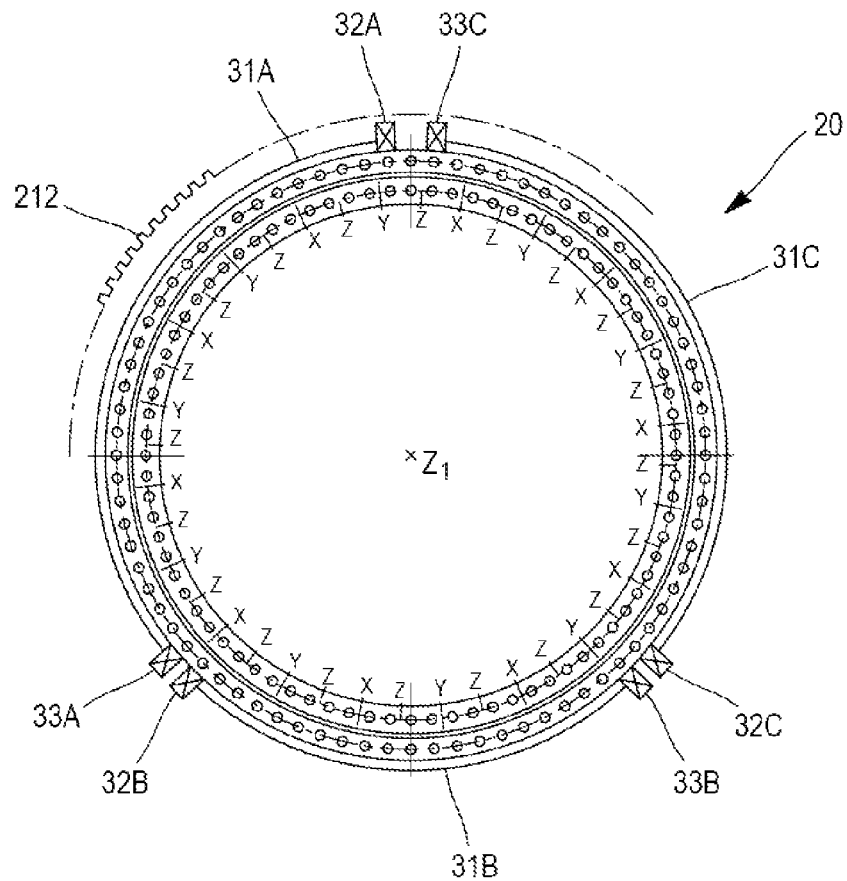

FIG. 6 shows a third example of implementation of a deformations monitoring device 60 on the bearing 20. In this example, the device 60 comprises three light sources 32A, 32B and 32C, three detectors 33A, 33B and 33C, and three optical fibres 31A, 31B and 31C. The optical fibre 31A runs between the light source 32A and the detector 33A; the optical fibre 31B runs between the light source 32B and the detector 33B; and the optical fibre 31C runs between the light source 32C and the detector 33C. The light sources 32A, 32B and 32C, and the detectors 33A, 33B and 33C are arranged on the peripheral surface 213 so that the optical fibres 31A, 31B and 31C overall cover the entire perimeter of the peripheral surface 213. Advantageously, each optical fibre covers substantially one third of the perimeter of the peripheral surface 213. Each optical fibre 31A, 31B, 31C can be centred with respect to a rotor blade 14. More generally, the deformations monitoring device can contain any number of assemblies each comprising an optical fibre, a light source and a detector. The advantage of having several assemblies available is to allow more localized monitoring of the deformations. Moreover, the optical fibres can overlap at least partially on the periphery of the surface to be monitored.

Figure 7:
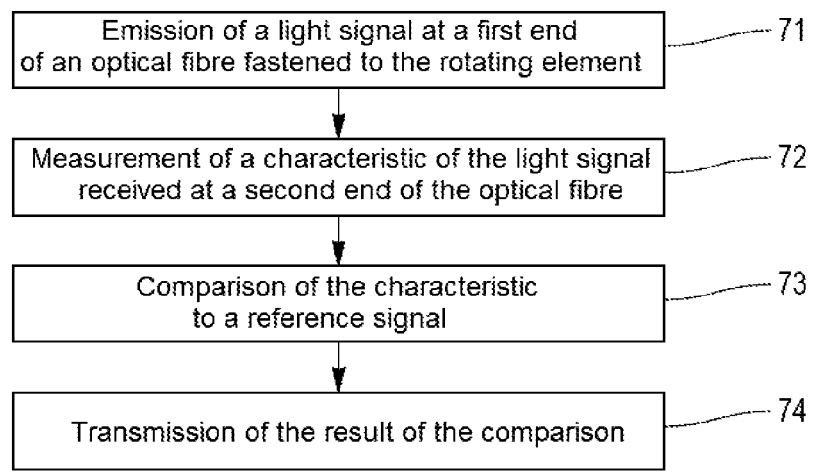
FIG. 7 shows an example of steps of the method for monitoring a rotating element according to the invention.

FIG. 7 shows an example of steps of the method for monitoring deformations according to the invention. The method is described here with reference to the example of implementation of the monitoring device in FIG. 4. In a first step 71, the light source 32 emits a light signal, for example a pulse, at a first end of the optical fibre 31. In a second step 72, the detector 33 receives the light signal at the other end of the optical fibre 31 and measures a characteristic of this light signal. As indicated previously, the characteristic can be an amplitude of the light signal, or a duration of transmission of the light signal between the light source 32 and the detector 33. The light signal can be single-frequency, spread over a frequency band, or also be composed of several single-frequency signals. Moreover, the optical fibre 31 can be a single-mode or multimode fibre. Thus, the characteristic measured by the detector 33 can in reality be the result of a combination of characteristics. In a step 73, the characteristic of the light signal is compared with a reference signal. The comparison is carried out by a processing module, incorporated into the detector 33 or not. The reference signal can be an amplitude value, for example an amplitude value of the light signal measured during an initialization phase, when the part to be monitored is considered to be flawless, and/or during an idle phase, when the part is not subject to any rotary movement. The reference signal can be also a reference duration, for example measured during the initialization and/or idle phase. Moreover, the light signal emitted by the light source 32 is not necessarily a pulse, but can be a continuous signal, in which case the reference signal can also be continuous. The duration of the light signal is for example determined so that the part to be monitored performs one complete revolution during this duration. A fatigue phenomenon reflected in an asymmetry of the part to be monitored can thus be observed due to a discontinuity of the light signal received by the detector 33. The light signal can be emitted and received at a predetermined frequency or at the request of an operator. The monitoring frequency can in particular depend on the criticality of the part to be monitored, and/or previous measurements carried out on the part to be monitored or on other parts mechanically connected to the part to be monitored. When several optical fibres are used for monitoring the deformations of one and the same part, the different light signals can be emitted independently of each other, or in a synchronized manner. The synchronization of the signals has the advantage of enabling correlation of the measurement results. The monitoring method according to the invention can also contain a step 74 of transmission of the result of each comparison between a light signal and a reference signal to an external device, for example a monitoring station. Alternatively, the data transmitted during the step 74 could be the light signals received by the detector or detectors 33, the comparison being carried out by the external device. According to a particular embodiment, the wind turbine contains a central unit collecting, preferably via a wireless link, the data originating from the detector 33, or from the processing module carrying out the comparison. Preferably, this central unit collects the data originating from all the detectors and/or from all the processing modules of the wind turbine in question. A common monitoring station for the entirety of a wind farm can then gather all of the data collected by the different central units, via a wired or wireless link.

Due to the movement undergone by the part to be monitored, the monitoring device 30 is preferably supplied by a battery, for example a lithium battery. Furthermore, the data transmission is preferably carried out by wireless link means. So as to limit the electricity consumption of the monitoring device 30 and to increase the life of the battery, the data transmission can be carried relatively infrequently, for example once a day. This frequency can be less than the measurement frequency, i.e. the frequency at which a light signal is emitted. According to an advantageous embodiment, the data are only transmitted when a flaw is found.

According to a particular embodiment, the monitoring device 30 takes advantage of the movement of the monitored part in order to increase its autonomy. In particular, the monitoring device 30 can contain an electricity generator driven by the movement of the part and making it possible to recharge the battery.

Figure 8:
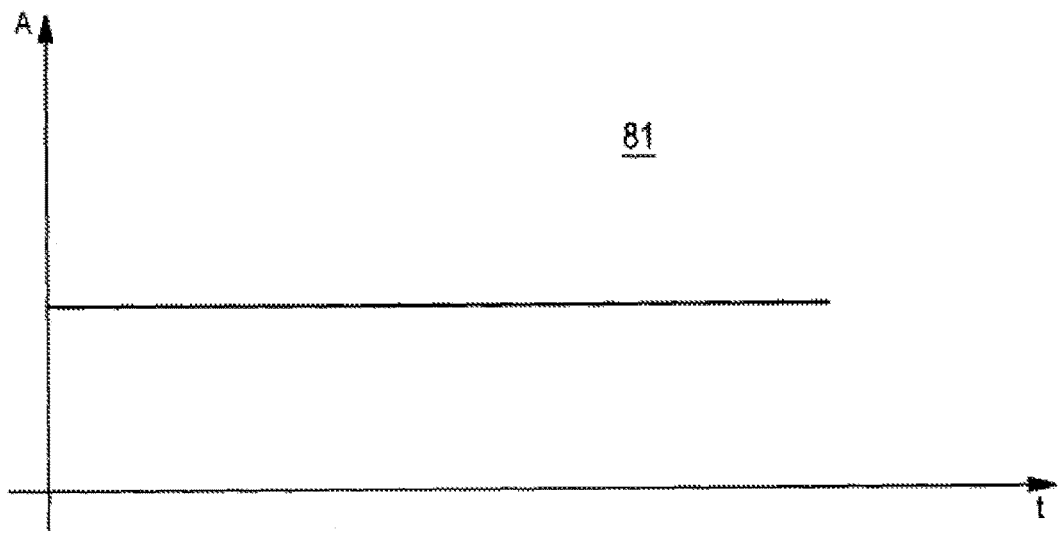
FIG. 8 shows, in two graphs, examples of light signals utilized by the monitoring device.
Figure 8:
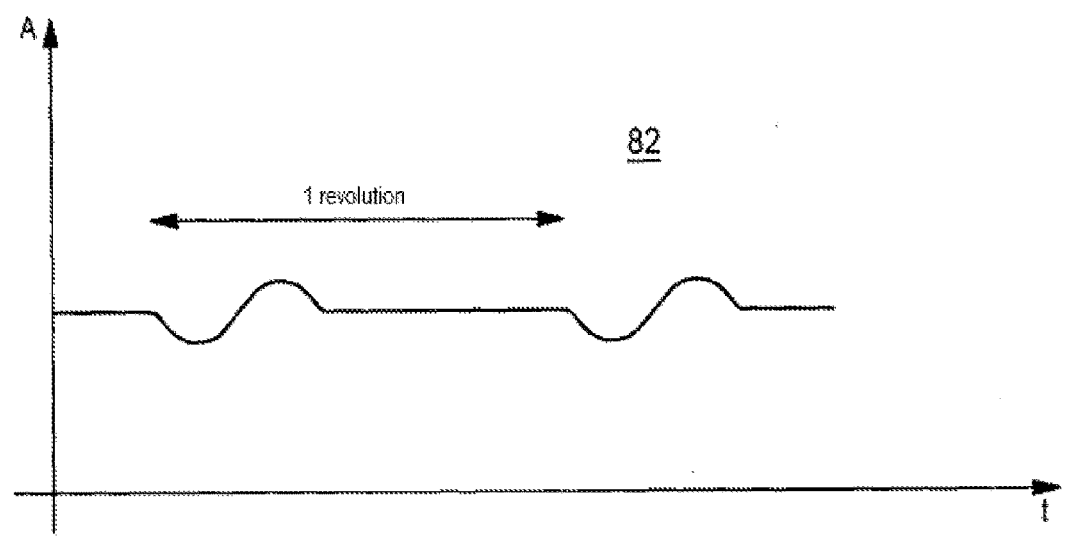

FIG. 8 shows, in two graphs, examples of light signals utilized by the monitoring device 30. A first graph 81 shows an example of a reference light signal, and the second graph 82 shows an example of a light signal received by the detector 33 in the event of a flaw in a part of the wind turbine. On each graph, the amplitude A of the signals is plotted as a function of time, over a duration corresponding substantially to two revolutions of the hub 13 of the wind turbine 10. As shown in the graph 81, the amplitude of the reference signal is substantially constant over time. In the absence of a flaw, the light signal received by the detector 33 would be identical or similar. In fact, in a normal situation, i.e. without wear or in the case of perfectly regular wear, the measurement signal shows no discontinuity during a complete rotation of the rotor blades. On the other hand, the graph 82 shows an undulation of the amplitude of the light signal, sign of an irregular, normally cyclical, variation in a stress undergone by the part, and therefore of the beginning of a flaw in the monitored part or of one of the parts connected thereto. It should be noted that monitoring the stress variation amounts to monitoring the effects of the first-order ageing of the part, by contrast to the monitoring of cracks, which are third-order effects. Stress monitoring thus makes it possible to manage the maintenance of the wind turbine in a more logical manner, by making it possible to plan the maintenance operations in advance.

The monitoring method according to the invention has been described with reference to a bearing between a hub and a rotor blade of a wind turbine. It could of course be applied to other bearings of a wind turbine, for example a bearing between the hub and a frame of the nacelle of a wind turbine, and to other parts undergoing a rotary movement, for example a wheel of a turbine or a Pelton wheel. More generally, the method is applicable to any rotating element having a surface the deformations monitoring of which is desirable. This surface can be a peripheral surface. In the case in point, it may be a surface of revolution an axis of revolution of which is merged with an axis of the rotary movement of the rotating element. Preferably, the section of optical fibre stretched between two points of the rotating element follows a convex portion of its surface.

The invention claimed is:

1. A method for predicting mechanical failure of a part capable of undergoing a rotary movement, the method comprising:
    emitting a light signal at a first end of an optical fiber, at least one section of the optical fiber being stretched in a pre-stressed condition along at least part of a periphery of a rotation bearing of the part;
    extracting a received light signal made of the emitted signal having reached a second end of the optical fiber, the second end being opposed to the first end with respect to a developed length of the fiber;
    measuring a characteristic of the received light signal, said characteristic varying as a function of the developed length of the optical fiber between the first end and the second end of the optical fiber;
    plotting the measured characteristic of the received signal as a function of time; and
    comparing the plotted characteristic of the received light signal with a reference.

2. The method according to claim 1, in which the section of optical fiber follows a convex portion of the surface of the part.

3. The method according to claim 1, in which the part is a rotating element of a wind turbine.

4. The method according to claim 1, in which the part is a rotating element of a turbine.

5. The method according to claim 1, in which a plurality of optical fibers is used, each optical fiber comprising a section stretched between two points on the surface of the part, for each optical fiber:
    a light signal is emitted at a first end;
    a characteristic of the light signal is received at a second end being measured; and
    the characteristic of the light signal is compared with a reference signal.

6. The method according to claim 5, in which the optical signals are emitted simultaneously in each optical fiber.

7. The method according to claim 5, in which two optical fibers are used, the stretched section of a first optical fiber being arranged with respect to the stretched section of the second optical fiber according to an axial symmetry, an axis of symmetry of which is an axis of the rotary movement of the part.

8. The method according to claim 5, in which the surface is a surface of revolution an axis of revolution of which is merged with an axis of the rotary movement of the part, the stretched sections of the optical fibers being angularly distributed along the axis of revolution to cover a circumference of the surface of revolution.

9. The method according to claim 1, also comprising transmitting, by wireless link means, each measured characteristic, or of the result of each comparison between the measured characteristic and the reference signal, or a part of these elements.

10. The method according to claim 9, in which the transmitting is carried out only in the case of a fault.

11. The method according to claim 1, in which the emitting, measuring and comparing steps are carried out continuously for a determined duration to allow monitoring of the deformations of the part for at least one complete rotation of the part.

12. A wind turbine having a part capable of undergoing a rotary movement, and a device for monitoring deformations of the part, the monitoring device comprising:
    an optical fiber at least one section of which is stretched in a pre-stressed condition along at least part of a periphery of a rotation bearing of the part;
    a light source capable of emitting a light signal at a first end of the optical fiber;
    a detector capable of measuring a characteristic of a received light signal made of the emitted signal having traveled at least up to a second end of the optical fiber, said characteristic varying as a function of the length of the optical fiber between the first and second ends of the optical fiber; and a processing module capable of plotting the measured characteristic as a function of time and comparing the plotted characteristic of the received light signal to a reference.

\* \* \* \* \*